US00RE37192E

(19) United States
(12) Reissued Patent
Detzel et al.

(10) Patent Number: US RE37,192 E
(45) Date of Reissued Patent: May 29, 2001

(54) ENERGY ABSORBING TUBE SUPPORT FOR FURNACE

(75) Inventors: Roger Alan Detzel, Norton; George Henry Harth, III, Wadsworth; Dennis Robert Shiffer, Canal Fulton, all of OH (US); Robert Wayne Wewer, Evergreen, CO (US)

(73) Assignee: McDermott Technology, Inc., Barberton, OH (US)

(21) Appl. No.: 09/453,602

(22) Filed: Nov. 30, 1999

Related U.S. Patent Documents

Reissue of:
(64) Patent No.: 5,692,457
Issued: Dec. 2, 1997
Appl. No.: 08/585,220
Filed: Jan. 11, 1996

(51) Int. Cl.[7] ..... F22B 37/24

(52) U.S. Cl. ..... 122/510; 122/511

(58) Field of Search ..... 122/510, 493, 122/490, 511

(56) References Cited

U.S. PATENT DOCUMENTS

| | | | | |
|---|---|---|---|---|
| 4,917,172 | * | 4/1990 | Falduti | 122/510 |
| 5,136,985 | * | 8/1992 | Krowech | 122/510 |
| 5,207,184 | * | 5/1993 | Kreider | 122/510 |
| 5,282,442 | * | 2/1994 | Payne | 122/510 |
| 5,449,037 | * | 9/1995 | Welkey | 122/510 |

* cited by examiner

*Primary Examiner*—Denise L. Ferensic
*Assistant Examiner*—Jiping Lu
(74) *Attorney, Agent, or Firm*—Rader, Fishman & Grauer PLLC

(57) ABSTRACT

A deformable and replaceable energy absorbing structure mounted between the furnace floor tubes and floor tube support truss to absorb impact from falling slag and prevent tube damage. A beam, such as an I-beam extends from the supporting structure and is adapted to hold a deformable structure. A tie bar attached to the floor tube panel extends across the panel and rests upon the deformable structure. This arrangement is provided at as many contact points between the floor tube panel and support structure as necessary to support the dead weight of the tubes while still providing suitable energy absorption characteristics.

4 Claims, 1 Drawing Sheet

ENERGY ABSORBING TUBE SUPPORT FOR FURNACE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention is generally related to industrial furnaces and particularly to the floor tube supports in such furnaces.

2. General Background

In industrial furnaces such as those used by utilities, heat exchange tubes which form the walls and floor carry a liquid that serves as a heat exchange medium. The tubes must be protected from cracking or crushing in order to operate efficiently. Slag particles carried in the hot furnace gases collect on the exposed surfaces in the upper furnace and, eventually, fall onto the floor tubes of the furnace. Even though furnace floors generally are sloped to shed slag and other deposits, the impact and weight of the slag has damaged or crushed the floor tubes in certain furnaces. Such furnaces have the problem of having rigid mountings for the floor tubes that force the tubes to absorb the impact and weight of the slag. This leads to support truss and tube damage, reduced operating efficiency, and the need for outages to make repairs and install new materials which also will be subject to damage. This results in a need in such furnaces for floor tube mountings that will prevent damage to the floor tubes and support trusses by absorbing the impact and weight of falling slag and that are replaceable at less cost than that of the heat exchange tubes.

SUMMARY OF THE INVENTION

The invention addresses the above need. What is provided is a deformable and replaceable energy absorbing structure between the furnace floor tubes and the floor tube supporting truss. When necessary to provide for greater distribution of the load over the supporting structure, additional vertical trusses may be added and the number of contact points between the vertical trusses and tube panels may be increased. A beam, such as an I-beam, extends from the supporting structure and is adapted to hold a deformable structure. A tie bar attached to the floor tube panel extends across the panel and rests upon the deformable structure. This arrangement is provided at as many contact points between the floor tube panel and support structure as necessary to support the dead weight of the tubes while still providing suitable energy absorption characteristics.

BRIEF DESCRIPTION OF THE DRAWINGS

For a further understanding of the nature and objects of the present invention reference should be made to the following description, taken in conjunction with the accompanying drawings in which like parts are given like reference numerals, and wherein.

DETAILED DESCRIPTION OF THE PREFERRED EMBODIMENT

Figure 1:
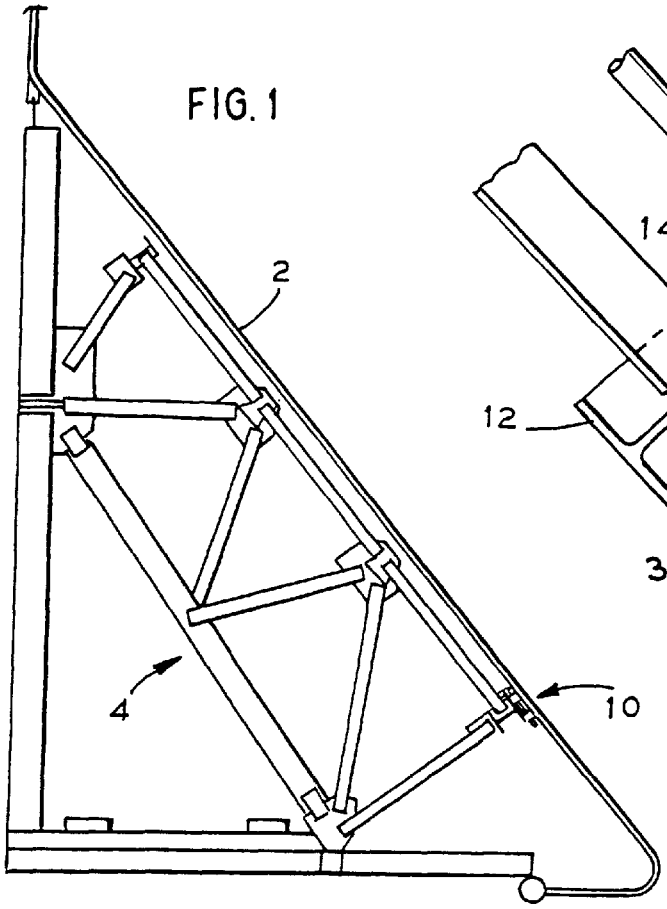
FIG. 1 is a sectional view of one side of the interior of a furnace.

Referring to the drawings, FIG. 1 is a sectional side view illustrating the interior of one side of a furnace. Heat exchange tubes 2 are supported at an angle by floor support truss 4 such that heat exchange tubes 2 extend downward generally toward the center of the furnace. Only one side of the furnace and heat exchange tubes contained therein are shown for ease of illustration. The invention is generally indicated by the numeral 10 in FIG. 1 and is illustrated in an enlarged view in FIG. 2.

Deformable energy absorbing structure 10 has an I-beam 12 attached at various points to floor support truss 4 to distribute the load over the truss structure. I-beam 12 has support lugs 14 attached across its width and extending upward to define a channel sized to receive stand-off 16 best seen in FIG. 3. Stand-off 16 absorbs the impact and weight of falling slag by deforming or crushing at an energy level less than that required to damage heat exchange tubes 2. Stand-off 16 is formed in the preferred embodiment from three and one-half inch schedule forty pipe.

Figure 3:
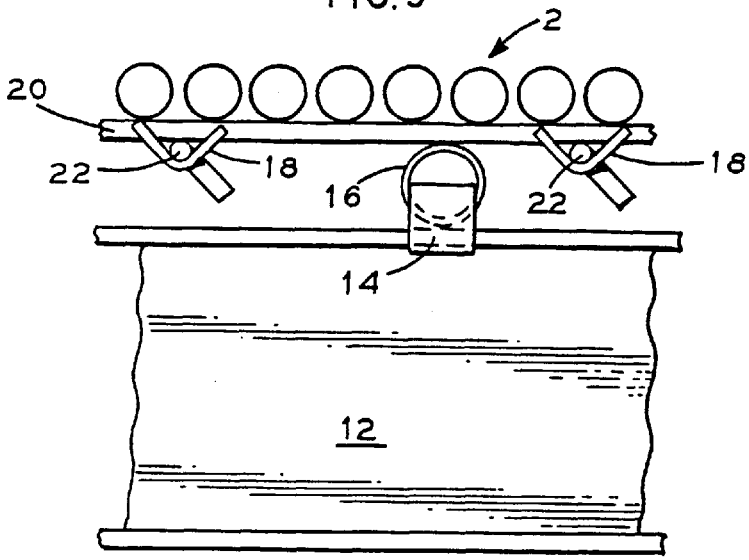
FIG. 3 is a view taken along lines 3—3 in FIG. 2.
Figure 2:
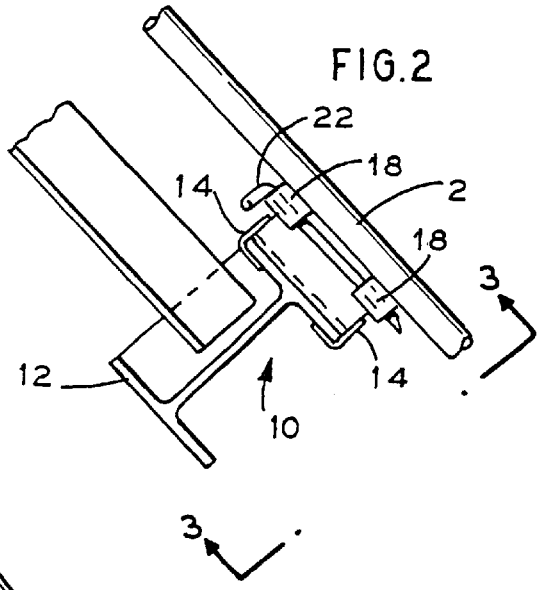
FIG. 2 is an enlarged view of the area indicated in FIG. 1 by the numeral 10.

As best seen in FIG. 2 and 3, a tie bar support lug 18 is attached to two adjacent heat exchange tubes 2 and a second tie bar support lug 18 is spaced along the length of tubes 2 such that tie bar 20 may be fit between the support lugs 14. A pin 22 placed through tie bar support lugs 18 and under tie bar 20 serves to hold tie bar 20 in position against tubes 2 such that tie bar 20 rests upon stand-off 16. Tie bar support lugs 18 and pins 22 are spaced apart at suitable intervals across tubes 2 to provide the necessary supporting contact to tubes 2. In this manner, several tie bars spaced apart under tubes 2 contact a number of stand-offs 16 and distribute the weight of tubes 2 across the tie bars. This prevents small contact points on one or two tubes which would damage the tubes. The number of contact points and trusses required will depend on the size of the furnace and the number of floor tubes involved.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a furnace for boilers having a row of heat exchange tubes forming the floor of the furnace, a deformable and replaceable energy absorbing structure mounted between the furnace floor tubes and floor tube support truss, comprising:

a. an I-beam mounted on the floor tube support truss, said I-beam having support lugs attached thereto across the I-beam width so as to define a channel between the support lugs;

b. a deformable stand-off placed in the channel defined by the support lugs;

c. a tie bar positioned between said stand-off and the heat exchange tubes;

d. tie bar support lugs attached to two adjacent heat exchange tubes and spaced apart along the length of the heat exchange tubes such that the tie bar will fit between said tie bar support lugs; and e. a pin placed through said tie bar support lugs under said tie bar.

*2. In a furnace for boilers having a row of heat exchange tubes forming the floor of the furnace, a deformable and replaceable energy absorbing structure mounted between the furnace floor tubes and floor tube support truss, comprising:*

*a. a support member mounted on the floor tube support truss;*

*b. a deformable stand-off positioned between said furnace floor tubes and said support member;*

*c. a tie bar positioned between said stand-off and the heat exchange tubes;*

*d. tie bar support lugs attached to two adjacent heat exchange tubes and spaced apart along the length of the heat exchange tubes such that the tie bar will fit between said tie bar support lugs; and*

*e. a pin placed through said tie bar support lugs under said tie bar.*

*3. The deformable and replaceable energy absorbing structure in claim 2, wherein said support member comprises an I-beam.*

*4. The deformable and replaceable energy absorbing structure in claim 2, wherein said deformable stand-off is tubular.*

* * * * *